United States Patent [19]
Brösecke et al.

[11] Patent Number: 6,018,949
[45] Date of Patent: Feb. 1, 2000

[54] INTERNAL COMBUSTION ENGINE WITH EXHAUST GAS TURBOCHARGER

[75] Inventors: Harald Brösecke, Stuttgart; Rudolf Klein, Weinstadt, both of Germany

[73] Assignee: DaimlerChrysler AG, Stuttgart, Germany

[21] Appl. No.: 08/936,588

[22] Filed: Sep. 24, 1997

[30] Foreign Application Priority Data

Sep. 24, 1996 [DE] Germany ............... 196 39 146

[51] Int. Cl.$^7$ ...................................... F01N 5/04
[52] U.S. Cl. ........................... 60/602; 60/280
[58] Field of Search ........................ 60/280, 602

[56] References Cited

U.S. PATENT DOCUMENTS

| 4,235,076 | 11/1980 | Meloche et al. . |
| 4,356,695 | 11/1982 | Sumi et al. . |
| 4,437,311 | 3/1984 | Iwamoto et al. . |

FOREIGN PATENT DOCUMENTS

| 2 650 860 | 2/1991 | France . |
| 31 15 739 | 11/1982 | Germany . |
| 38 07 998 | 9/1988 | Germany . |
| 40 02 081 | 8/1991 | Germany . |
| 41 39 291 | 6/1993 | Germany . |
| 43 11 904 | 10/1994 | Germany . |
| 57-126516 | 8/1982 | Japan . |
| WO 91/16529 | 10/1991 | WIPO . |

*Primary Examiner*—Noah P. Kamen
*Attorney, Agent, or Firm*—Klaus T. Bach

[57] ABSTRACT

In an internal combustion engine with an exhaust gas turbocharger having an exhaust gas turbine arranged in an engine exhaust pipe upstream of a catalytic converter and a bypass line branching off the exhaust pipe upstream of the exhaust gas turbine and rejoining the exhaust pipe between the exhaust gas turbine and the catalytic converter, a bypass valve is provided which is so controlled that, after startup of the internal combustion engine, the bypass valve is, during a catalytic converter heat-up period, at least partially opened when the internal combustion engine load is below a predetermined value and is only closed when the engine load is above the predetermined value.

1 Claim, 1 Drawing Sheet

INTERNAL COMBUSTION ENGINE WITH EXHAUST GAS TURBOCHARGER

BACKGROUND OF THE INVENTION

The invention resides in an internal combustion engine with an exhaust gas turbocharger having an exhaust gas turbine arranged in an engine exhaust pipe upstream of a catalytic converter and a bypass line for the exhaust gas by which exhaust gas can be discharged without flowing through the exhaust gas turbine.

Such an internal combustion engine is shown for example in U.S. Pat. No. 4,356,695, the publication WO 91/16529 and in DE 38 07 998 A1. There are provided bypass valves which are operated by the pressure in the engine intake pipe in such a way that the bypass valve opens when the pressure in the engine intake pipe is excessively high so that part of the exhaust gas flow bypasses the exhaust gas turbine.

DE 43 11 904 A1 discloses an internal combustion engine with a bypass line which branches off the exhaust pipe upstream of the exhaust gas turbine. It forms a separate exhaust gas line with its own catalytic converter, which includes a controllable bypass valve by which it can be closed or opened. During a cold start, the bypass valve remains closed in order to direct all the exhaust gas through the exhaust gas turbine and the respective catalytic converter. The bypass line is opened only when the charge air pressure is excessive so as to limit the charge air pressure for the engine.

DE 31 15 739 A1 discloses an exhaust gas system with an exhaust gas line which includes a start up catalytic converter arranged downstream of the exhaust gas turbine of an exhaust gas turbocharger and a main catalytic converter arranged downstream of the startup catalytic converter. A bypass line with a bypass valve branches off the exhaust gas line upstream of the exhaust gas turbine and rejoins the exhaust gas line between the startup catalytic converter and the main catalytic converter. The bypass valve, which is controlled by charge air pressure in the engine intake duct, is opened at high engine load and speed so that then only a part of the total exhaust gas stream flows through the startup catalytic converter whereby the thermal loading thereof is reduced.

DE 41 39 291 A1 discloses an arrangement for a rapid detoxification of the exhaust gas of an internal combustion engine after a cold start. It includes an exhaust gas line which, upstream of an exhaust gas turbine, branches into a first line which leads to a startup catalytic converter and then to an exhaust gas turbine. It further includes a second line, which extends parallel to the first line and also leads to the exhaust gas turbine and a bypass line, which rejoins the first line upstream of the main catalytic converter, but bypasses the exhaust gas turbine. The distribution of the exhaust gas flow to the three branches is performed by a valve which is arranged in the branch-off area and which is controlled by an electric control motor and an electronic control unit. During cold engine operation, all the exhaust gas is conducted through the startup catalytic converter and the exhaust gas turbine. Only when the charge air pressure becomes excessive, part of the exhaust gas stream is conducted through the bypass line for controlling the charge air pressure.

FR 2 650 860 A1 discloses such an internal combustion engine wherein the bypass valve is opened during cold start operation of the engine depending on an engine temperature specific parameter, particularly the catalytic converter efficiency, the exhaust gas temperature or the cooling water temperature. In this way, it is made sure that not only the charge air pressure is limited as it is usually the case, but that also the exhaust gas turbocharger is at least partially bypassed even when the engine is still cold. In this way the exhaust gas remains somewhat warmer and the catalytic converter is heated more rapidly. The bypass valve is closed when the catalytic converter has reached operating temperature.

DE 40 02 081 A1 discloses such an internal combustion engine, especially a Diesel engine, which includes a startup bypass line which is open during the startup procedure only for a short, predetermined period by a bypass valve. The bypass valve can be placed for that purpose, by way of a fluid pressure motor in communication with a particular pressure source, whereas, during the following normal engine operation, the valve acts as a normal waste gate. In another example, two bypass lines are provided wherein a normal waste gate is disposed in a first line and the other line is used to reduce the exhaust gas back pressure during engine startup. For this purpose, there is provided a bypass valve, which can be opened by a fluid pressure motor which can be operated selectively by pressurized fluid or vacuum.

It is the object of the present invention to provide an internal combustion engine with an exhaust gas turbocharger of the type referred to above, but with which engine exhaust emissions are reduced in a simple manner utilizing a simple inexpensive arrangement.

SUMMARY OF THE INVENTION

In an internal combustion engine with an exhaust gas turbocharger having an exhaust gas turbine arranged in an engine exhaust pipe upstream of a catalytic converter, a bypass line branches off the exhaust pipe upstream of the exhaust gas turbine and rejoins the exhaust pipe between the exhaust gas turbine and the catalytic converter. A bypass valve is provided which is so controlled that, after startup of the internal combustion engine, the bypass valve is, during a catalytic converter heat-up period, at least partially opened when the internal combustion engine load is below a predetermined value. It is only closed when the engine load is above the predetermined value.

During engine startup the exhaust gas is therefore conducted past the exhaust gas turbine directly to the catalytic converter. In this way the exhaust gas loses less heat energy than it would if it would be conducted through the turbine. Consequently, it brings the exhaust gas catalytic converter after engine start-up more rapidly to its operating temperature. If the engine load exceeds the respective threshold value, the bypass valve is closed so that the exhaust gas turbocharger may generate the desired charge air pressure.

In a particular embodiment of the invention, the bypass valve control means includes a bi-pressure motor with two separate pressure chambers and a valve control unit. An operating rod is coupled to the bypass valve and is movable depending on the difference of the pressures in the two pressure chambers The pressure chambers can be placed in communication selectively with the atmosphere or with an intake duct portion of the internal combustion engine, one by means of a controllable pressure valve and the other by a controllable vacuum valve. The valve control unit controls the pressure valve and the vacuum valve in such a way that, after startup of the engine during the catalytic converter heat-up period and while the engine load is below a predetermined value, the first pressure chamber is in communication with the atmosphere and the second pressure chamber is in communication with an air intake duct section for opening the bypass valve. Otherwise, the first pressure chamber is in communication with the air intake duct section and the second pressure chamber is in communication with the atmosphere for closing the bypass valve. With this arrangement, the exhaust gas is cleaned after engine startup more effectively, particularly after a cold engine start. This is achieved in a simple manner and with inexpensive means.

A preferred embodiment of the invention will be described below on the basis of the accompanying drawings.

DESCRIPTION OF A PREFERRED EMBODIMENT

Figure 1:
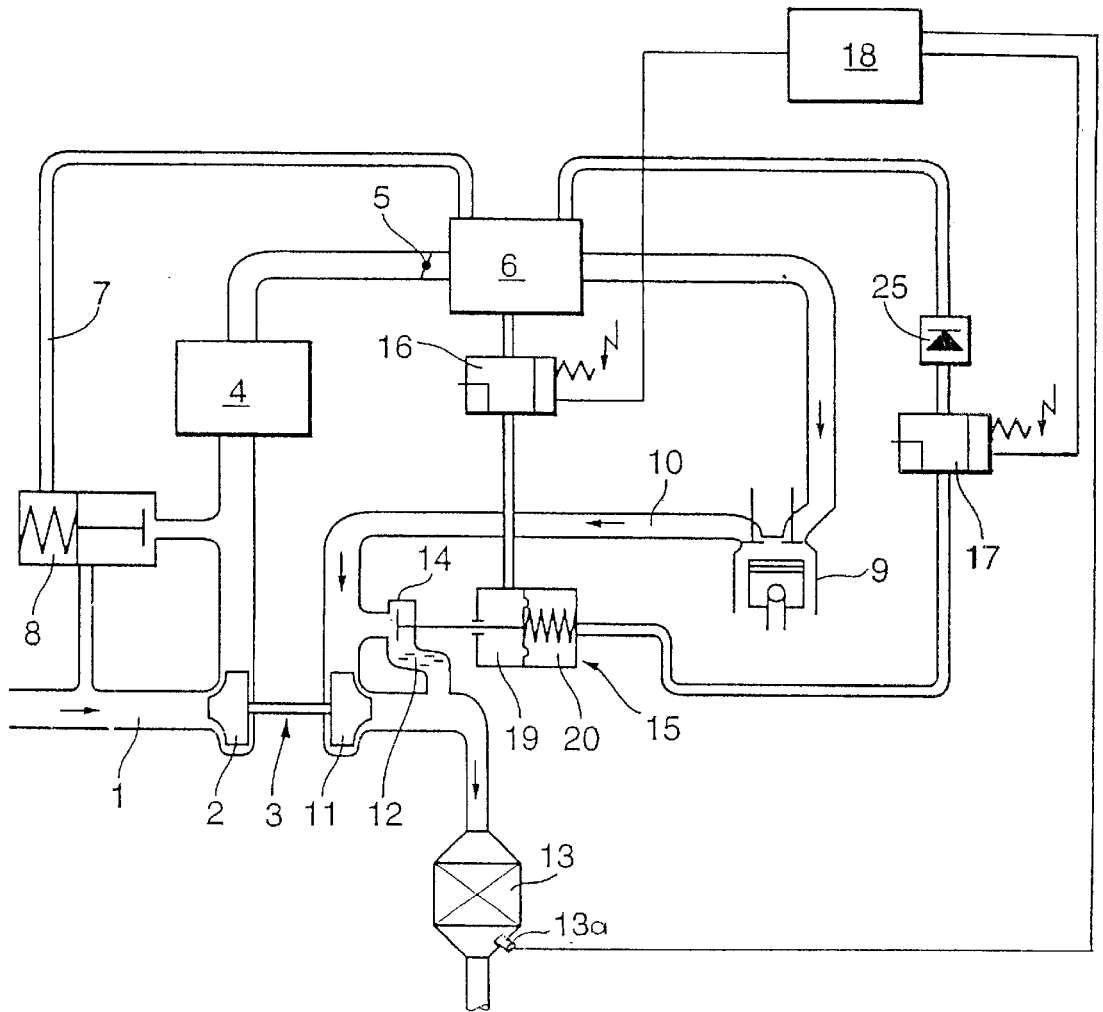
FIG. 1 is a schematic representation of an internal combustion engine according to the invention.

FIG. 1 shows schematically an internal combustion engine in accordance with the invention, which, in the embodiment shown, is a piston engine. It includes an air intake pipe 1 with a compressor 2 of an exhaust gas turbocharger 3 from which the air is supplied to a charge air intercooler 4. From the intercooler 4, the air is supplied, via a throttle valve 5 to an air intake duct 6. For controlling the air intake conditions during engine brake operations—an additional air pipe 7 is provided which includes a bypass valve 8. The intake duct 6 is in communication with the combustion chambers of the respective cylinders 9 from which also an exhaust pipe 10 extends. Downstream of the cylinder 9, the exhaust pipe 10 leads to the exhaust gas turbine 11 of the exhaust gas turbocharger 3.

A bypass line 12 is connected to the exhaust pipe 10 upstream of the exhaust gas turbine 11 and between the exhaust gas turbine 11 and an exhaust gas catalytic converter 13 disposed in the exhaust pipe 10. It includes a bypass valve 14, which is also called waste gate, by which the bypass line 12 can be opened or closed. Intermediate valve positions are also possible. The bypass valve is operated by a bi-pressure motor which includes two pressure chambers 19, 20. The pressure chambers 19, 20 can be placed, by way of an electromagnetic pressure valve 16 or, respectively, an electromagnetic vacuum valve 17 and a serially arranged check valve 25 and the appropriate connecting lines, in communication either with the intake duct 6 or with the atmosphere. For controlling the two valves 16 and 17, there is provided a valve control unit 18, which may be part of the engine control unit generally used for controlling engine operation. In this way, the momentary state of the engine is also provided to the valve control unit 18.

Figure 2:
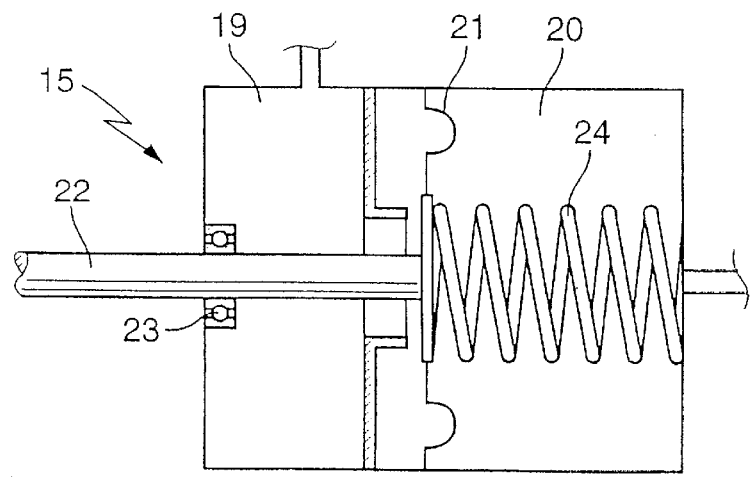
FIG. 2 is a cross-sectional view of a two-pressure motor used in the arrangement shown in FIG. 1.

FIG. 2 is a cross-sectional view of the bi-pressure motor unit 15 used in the embodiment of FIG. 1. The motor unit 15 includes two pressure chambers 19, 20, which are separated by a membrane 21 mounted at its circumference and having a center section where an operating rod 22 is connected to the membrane 21 for operating the bypass valve 14. A seal 23 is disposed around the operating rod 22 where it extends through the wall of the first pressure chamber 19. The membrane 21 and accordingly the operating rod 22 are biased in the closing direction of the bypass valve by a spring 24 so that, in the position of the membrane 21 as shown in FIG. 2, the bypass valve 14 is closed.

Accordingly, if the same pressure is present in the first and second pressure chambers 19 and 20, the membrane 21 is held, by the force of the spring 24, in the position as shown in FIG. 2. In this position the operating rod 22 holds the bypass valve 14 in a closed state. The spring force is so selected that the bypass valve can be opened by a vacuum in the air intake duct when the engine is operating under a low load. On the other hand, the bypass valve can be opened by a pressure in the intake air duct corresponding to the desired maximum pressure in the intake air duct of the internal combustion engine. When the first pressure chamber 19 is pressurized and the second pressure chamber 20 is in communication with the atmosphere the membrane 21 is moved against the force of the spring 24 whereby the operating rod 22 opens the bypass valve 14. This also occurs when the first pressure chamber 19 is in communication with the atmosphere and a vacuum is established in the second pressure chamber 20.

As a result, the internal combustion engine as shown in FIG. 1 operates as follows:

Before an engine startup the bypass valve 14 is closed because of the closing force of the spring 24 since there is no pressure difference between the first and second pressure chambers 19 and 20. As soon as the piston in the respective cylinders 9 begins to move, a vacuum is generated in the combustion chamber during the suction stroke which vacuum is transmitted to the air intake duct 16. After startup, the engine is idling or operating at an engine load, which is below a predetermined threshold value. The then available exhaust gas energy is insufficient to generate, by way of the exhaust gas turbine 11 and the compressor 2 of the exhaust gas turbocharger 3, any excess pressure in the air intake duct 6. As a result, a vacuum (less than atmospheric pressure) is established in the air intake duct 6. In this operating state of the engine the engine load is below a predetermined threshold value. This state is transmitted to the valve control unit 18 which, as a result, controls the pressure and vacuum valves 16 and 17 in such a way that the electromagnetic vacuum valve 17 places the air intake duct 17 in communication with the second pressure chamber 20. At the same time, the electromagnetic pressure valve 16 places the first pressure chamber 19 in communication with the atmosphere. With the pressure difference established in this way between the pressure chambers 19 and 20, the membrane 21 and the operating rod 22 coupled therewith are moved against the force of the spring 24, whereby the bypass valve 14 is opened. The now open bypass line 12 permits exhaust gas from the exhaust pipe 10 to bypass the exhaust gas turbine 11 so that this exhaust gas performs no work in the turbine which would reduce its temperature and furthermore loses no heat to the turbine by heat transfer. Under this condition, most of the exhaust gas flows through the bypass line 12 and remains substantially warmer then it would if it had to flow through the turbine 11. Consequently, the exhaust gas catalytic converter 13 to which the hot exhaust gas is now directly supplied by bypassing the exhaust gas turbine 11 is heated substantially faster so that its exhaust gas clean up functions can be fulfilled more rapidly. The temperature of the catalytic converter 13 is sensed b a temperature sensor 13a which supplies the temperature signal to the valve control unit 18.

When the catalytic converter has reached its operating temperature or the engine is subjected to a load greater than a predetermined threshold value the [engine] control unit switches the electromagnetic valves 16 and 17. In this case the electromagnetic pressure valve 16 places the first pressure chamber 19 in communication with the air intake duct 6 and the electromagnetic vacuum valve 17 places the second pressure chamber 20 in communication with the atmosphere. With this pressure difference change in the bi-pressure motor 15 and the force of the spring 24, the membrane then moves to the position as shown in FIG. 2, whereby the bypass valve 14 is closed by the operating rod 22. All the exhaust gas then flows through the exhaust gas turbine 11, which drives the compressor 2. By operation of the compressor 2, the desired charge air pressure is provided in the air intake duct 6 during normal engine operation.

The air pressure generated in the air intake duct 6 is transmitted, by way of the electromagnetic pressure valve 16 to the first pressure chamber 19 and is consequently effective on the membrane 21 against the force of the spring 24. If the pressure in the air intake duct 6 exceeds a maximum value predetermined by the spring 24, there is between the two pressure chambers 19 and 20 in the bi-pressure motor 15 a pressure difference which causes at least partial opening of the bypass valve 14. In this way, the pressure in the air intake duct 6, that is, the charge air pressure, is limited as it is common in the art.

It should be understood that arrangements other than the bi-pressure motor and the control arrangement therefor may be used for controlling the bypass valve 14. It is merely necessary that they are able to at least partially open the bypass valve 14 after engine startup while the catalytic converter is in the heat up phase and the engine load is below a predetermined value.

What is claimed is:

1. An internal combustion engine including an exhaust gas pipe arrangement with an exhaust gas catalytic converter, an exhaust gas turbocharger having an exhaust gas turbine arranged in the exhaust gas pipe upstream of said catalytic converter, a bypass line having one end connected to said exhaust gas pipe upstream of said exhaust gas turbine and its opposite end connected to said exhaust gas pipe between said exhaust gas turbine and said catalytic converter and including a bypass valve, and means for controlling said bypass valve, said bypass valve control means comprising a bi-pressure motor having two separate pressure chambers and an operating rod coupled to said bypass valve and being movable depending on the pressure difference in the two pressure chambers, one of said pressure chambers having associated therewith a controllable pressure valve for placing said one pressure chamber in communication selectively with the atmosphere or with an engine air intake duct and the other pressure chamber having associated therewith a controllable vacuum valve for placing said other pressure chamber in communication selectively with the atmosphere or said engine air intake duct and a valve control unit for controlling said controllable pressure valve and said controllable vacuum valve in such a way that, after startup of said internal combustion engine and during a catalytic converter heat up period, said first pressure chamber is placed in communication with the atmosphere and the second pressure chamber is placed in communication with the air intake duct so as to open said bypass valve to permit the engine exhaust gas to bypass said exhaust gas turbine, and said first pressure chamber is placed in communication with said air intake pipe and said second pressure chamber with the atmosphere when said catalytic converter has reached operating temperature or the engine load is above a predetermined value.

\* \* \* \* \*